United States Patent [19]

Vaseen

[11] 4,195,118

[45] Mar. 25, 1980

[54] CONSTANT STRENGTH FUEL-FUEL CELL

[76] Inventor: Vesper A. Vaseen, 9840 W. 35th Ave., Wheatridge, Colo. 80033

[21] Appl. No.: 31,622

[22] Filed: Apr. 19, 1979

[51] Int. Cl.$^2$ .............................................. H01M 8/04
[52] U.S. Cl. .................................................... 429/15
[58] Field of Search .................. 429/15, 17, 22, 25, 429/13, 12

[56] References Cited

U.S. PATENT DOCUMENTS

| | | | |
|---|---|---|---|
| 3,274,029 | 9/1966 | Lurie et al. | 429/25 |
| 3,370,984 | 2/1968 | Platner | 429/25 |

FOREIGN PATENT DOCUMENTS

| | | | |
|---|---|---|---|
| 792297 | 8/1968 | Canada | 429/22 |

Primary Examiner—Donald L. Walton

[57] ABSTRACT

A fuel cell is an electrochemical apparatus composed of both a nonconsumable anode and cathode; and electrolyte, fuel oxidant and controls. This invention guarantees the constant transfer of hydrogen atoms and their respective electrons, thus a constant flow of power by submergence of the negative electrode in a constant strength hydrogen furnishing fuel; when said fuel is an aqueous absorbed hydrocarbon, such as and similar to ethanol or methnol. The objective is accomplished by recirculation of the liquid fuel, as depleted in the cell through specific type membranes which pass water molecules and reject the fuel molecules; thus concentrating them for recycle use.

1 Claim, No Drawings

CONSTANT STRENGTH FUEL-FUEL CELL

INTRODUCTION AND DESCRIPTION OF PRIOR ART

Prior disclosures and inventions of the inventor has led to the adaption of this experience to the invention of a constant fuel quality fuel cell.

The first recorded history of an operating fuel cell was disclosed when Sir Humphrey Davy in 1802 built a cell with carbon electrodes and nitric acid electrolyte. The first hydrogen-oxygen cell was operated by Sir William Grove in 1839.

By 1959, F. T. Bacon and J. C. Frost of Cambridge University built and demonstrated a 6-KW fuel cell unit. Also in 1959 H. K. Ihrig of American Allis-Chalmers demonstrated their 20-HP fuel cell tractor. Since 1959 numerous operating fuel cells of various types have been reasonably successfully used.

Fuel cells can be classified as high, medium and low temperature. High temperature cells are typified by use of molten salt electrolytes: (1000°–1200° F.). Medium temperature by such as the "Bacon" hydrogen-oxygen cell (400° F.); and low temperature any number of systems of hydrogen-oxygen that operate up to the boiling point of the particular electrolyte. Electrolytes are also designated as acid or basic salts. Fuel cells are also classified by the form of fuel. Gaseous fuel is typified by hydrogen, liquid by alcohol and solids by coal or metals. Oxidants for use in cells of all types are in general limited to oxygen, air, and hydrogen peroxide.

The advantage of the fuel cell is that chemical energy is converted directly into electricity without a preliminary conversion to heat. Consequently, the conversion is not subject to the limitations of the Carnot cycle, and thermal efficiencies of as high as 90% are theoretically possible.

Due to the low thermal voltage of individual cells it is necessary to connect a number of cells in series to obtain desired voltages.

Manufacturing costs of fuel cells is low as compared to engines. There are no moving parts hence sealing problems are minimal.

Both fuel and oxidant manifolds and diffusers are amenable to mass production from low cost materials.

Most fuel cells present little or no maintenance problems.

Performance of fuel cells systems is often defined in terms of power per unit of volume and per unit of weight, both vs. time. In this regard fuel cells require more volume and are heavier than most other energy producers.

Fuel cells are noiseless, low heat loss, clean, with non-objectionable products of combustion carbon dioxide, nitrogen and water. Fuel cells only consume fuel when power is drawn from the system.

The fuel introduced to the normal fuel cell apparatus is deteriorated to some degree immediately upon introduction and creation of power. This invention provides the disclosure and art and science of enriching these specific hydrocarbon fuels dissolved in aqueous substrate, so as to by recirculation through the fuel cell provide a constant strength and quality fuel to the fuel side electrode within the cell; thus increasing the cells efficiency of constant power production.

REFERENCES:
U.S. Pat. Nos.

| | | | |
|---|---|---|---|
| 341,727 | 5/1886 | Cabell | 210/243 |
| 1,056,043 | 3/1913 | Morrison | 55/3 |
| 1,056,244 | 3/1913 | Wiley | 55/68 |
| 1,722,458 | 7/1929 | DeBaupre | 55/68 |
| 3,177,633 | 4/1965 | McDonald, Jr. | 55/3 |
| 3,762,133 | 10/1973 | Merriman, Et. Al. | 55/08 |
| 4,049,398 | 9/1977 | Vaseen | 55/36 |

U.S. Pat. Nos. PENDING

| | | |
|---|---|---|
| 940,904 | 9/11/78 | Vaseen |
| 948,588 | 10/4/78 | Vaseen |
| 951,231 | 10/13/78 | Vaseen |
| 004,067 | 01/17/79 | Vaseen |

SUMMARY

The description of the process hereafter concerns itself with the electrochemical reactions of, probably the simplest fuel cell, the hydrogen-oxygen fuel cell. The principals involved with the disclosures in this invention are applicable to many types of fuel cell configurations, types of fuels, and temperature and pressure combinations. It is the intent of this disclosure of method principals and process to improve the efficiency of these as well by the application of similar process modifications.

Although the disclosure herein may refer to types and kinds of electrodes in explaining this invention it is not the intent herein to fix or apply this process improvement to these, but only to simplify the explanation.

When hydrogen bearing fuels which are miscible with water are used as the fuel the concentration of hydrogen electrons adjacent to the electrode, as the electrons are transferred to the electrolyte, decrease the concentration of hydrogen atoms and electrons at the electrode as well as depletes the hydrogen atoms and molecules in the aqueous fuel phase.

The fuel cell consists of a compartment within which the hydrogen bearing fuel is contained for a short period of time, then circulated through a membrane specific for passing water, but rejecting the hydrogen bearing fuel materials. The "Reject" of the membrane is controlled to produce the same strength fuel; that is, same percentage of hydrogen as the original feed fuel to the cell. This material is returned to the fuel side of the cell. Thus is the fuel cell always supplied a constant quality fuel.

Potential fuels for the fuel cell are any chemical or combination thereof with electrochemical reactions. Some of the more probable are:

| Fuel | AMPS/Ft$^2$ | Expected Voltage vs. Theoretical with $O_2$ |
|---|---|---|
| Hydrogen | 100 | 0.7 |
| Formaldehyde | 50 | 0.6 |
| Ethanol | 35 | 0.5 |
| Methanol | 30 | 0.4 |
| Propanol | 16 | 0.4 |
| Butanol | 16 | 0.4 |
| Propylene | 15 | 0.5 |
| Butylene | 15 | 0.5 |
| Sec. Butanol | 10 | 0.3 |
| Sec. Propanol | 8 | 0.3 |
| Tert Amyl Alcohol | 6 | 0.3 |
| Butane | 5 | 0.3 |
| Ethane | 3 | 0.3 |

| Fuel | AMPS/Ft$^2$ | Expected Voltage vs. Theoretical with O$_2$ |
|---|---|---|
| Tert Butanol | 2.5 | 0.3 |
| Methane | 2 | 0.2 |

PREFERRED EMBODIMENT

In order to teach the science and art of improving the fuel cell efficiency, this will be done by way of example. For instance a fuel cell is designed for ethanol fuel at a constant quality of preferably 50% or greater by weight. Gaseous oxygen is used for example as the oxidant. The cell is designed, for example, to operate at 25° C. with 30% by weight potassium hydroxide as the electrolyte. Those familiar with fuel cells have no difficulty with designing such a unit. This example is based on a cell with 929 Sq. cm. of both positive and negative (plate) electrodes operating at 30 amperes and 0.5 volts.

Normal design of a fuel cell uses pressure differentials between the electrolyte and the fuel or oxidant gases, to control water formation in both the electrolyte and the gases phase. This invention is not concerned with the water formation in the fuel side as the continual processing by mechanical membrane type filter removes the excess water as fast as it is produced.

The normal potential of the oxygen electrode in alkaline solution is +0.4 volts versus the standard hydrogen electrode. According to theory the electrode reaction should be: $O_2 + 2H_2O + 4e - = 4Oh^-$. It has been found however, on carbon/O$_2$ electrodes at room temperature, the greater part of the reaction is: $O_2 + H_2O + 2e - = HO_2^- + OH^-$.

The hydrogen electrode in alkaline solution is expected to react as $$H_2 + 2OH^- = 2H_2O + 2e-$$

Since hydrogen is not active on untreated carbon electrodes, they are, preferably, coated by depositing a noble metal catalyst on their surface.

Structural configurations of the fuel cell range from simple paired electrode to multi-electrode with their respective advantages. Also from concentric cell to parallel plates. Since all the configurations are adaptable to the use of liquid fuels, those versed in the art and science of fuel cells will have no difficulty in selecting a specific configuration for their specific design requirements.

Most low temperature, less than boiling of an aqueous electrolyte, fuel cell have found potassium hydroxide solution the most usable. Preferably, due to the conductivity, a 30% by weight solution is used. Sodium hydroxide is also a commonly used electrolyte.

The following table provides design data for selection of strength of electrolyte use.

| | PROPERTIES OF KOH SOLUTIONS | | | | |
|---|---|---|---|---|---|
| Wt. & at 15° C. | Density Gm/Ml 15° C. | Resistivity OHM cm 18° C. | Resistivity T-COEFF | Viscosity 18° C. | CP 60° C. |
| 10 | 1.092 | 3.20 | 0.0187 | 1.30 | 0.58 |
| 20 | 1.188 | 2.00 | 0.0196 | 1.72 | 0.82 |
| 30 | 1.290 | 1.84 | 0.0220 | 2.50 | 1.18 |
| 40 | 1.399 | 2.20 | 0.0267 | 4.0 | 1.80 |
| 50 | 1.514 | 3.0 | — | 9.2 | 3.2 |

Those versed in the art and science of fuel cells will have no difficulty selecting an acidic or alkaline electrolyte and strength for a specific design using an aqueous miscible hydrocarbon fuel.

Water is produced in each cell at the rate of 10 grams per hour per each 30 amperes. The membrane filter; therefore, is preferably one which will "pass" 10 grams per hour for each 30 ampere, 929 Sq. cm. area pair of electrodes. Those versed with the selection of ultrafilter and reverse osmosis type membranes will have no difficulty in selecting membrane material for this purpose.

The fuel cell is operated by providing oxygen as a gas or as dissolved in a liquid or as a compound such as H$_2$O$_2$ liquid; so as to provide for each cell preferably 0.009 grams per minute. Those versed in the art and science of fuel cells will have no difficulty selecting the type of oxide and companion type electrode. The oxidant is continuously fed to the electrode so as to provide a constant 0.009 grams per minute to the cell.

The ethanol ranging from (4%) four percent beer (or wine) to (100%) onehundred percent and preferably greater than 50% recirculated first to the electrode, then the selected membrane filter, with the membrane "reject" material returned to the fuel electrode at the same weight percentage ethanol as the initial feed material. The water passed through the membrane filter disposed of. Those versed with the art and science of fuel cells will have no difficulty selecting the companion type electrode for the strength of ethanol used. Preferably the ethanol, methanol, or other hydrogen fuel is (50%) fifty percent or greater by weight.

The pressure or superatmospheric pressure of the electrolyte, oxidant, and fuel sections of the cell are adjusted by enclosed cell structure, and valves and controls, to retain the maximum water production within the fuel section. Those versed in the art and science of fuel cells will have no difficulty with this requirement.

The example provided herewith describes and teaches the art and science of a single cell with a 929 sq. cm positive and 929 sq. cm. negative electrode area; providing 30 ampere hours at 0.5 volts. Twenty-three cells in series thus provides 115 volts at 30 amperes. The 115 volt system uses 0.207 grams per minute of oxygen, 0.02553 grams per minute of hydrogen and produces 0.115 grams of water per minute.

The aqueous hydrogen containing fuel is recirculated through a select membrane to remove water formed in the cell fuel section.

The mechanical separation of ethanol and other atoms and molecules from water is to select a mechanical barrier that allows molecules of water to pass but excludes others. Such a selective barrier exists in the form of synthetic membranes made from various polymers. Membranes of this kind have been known for many years, but only recently have certain impediments to their commercial exploitation been overcome. The synthetic membranes discriminate between substances on the basis of several properties. In the process called ultrafiltration molecules are separated according to their size. In electrodialysis the molecules are separated according to their electric charge. Membranes that are permeable almost exclusively to water are employed in the process known as reverse osmosis.

The theory of ultrafiltration is best shown by placing a membrane between two liquids; one of water and the other of ethanol dissolved in water. Assuming a membrane selected which is freely permeable to water and completely impermeable to ethanol the magnitude and direction of flow through the membrane is then controlled by a number of factors.

Osmotic pressure tends to drive the water side, through the membrane into the ethanol/water mixture. If the membrane system was to be left alone, pure water would flow to dilute the ethanol solution. Applying pressure on the ethanol solution side, however, reverses this, if the applied pressure exceeds the osmotic pressure; then the water flows through the membrane to the water side, leaving a more concentrated ethanol solution. The rate of flow is proportional to the difference in pressure, also directly proportional to the permeability of the membrane and inversely proportional to the membrane thickness.

Selection of membrane material required for ethanol concentration, makes it mandatory the material be hydrophilic, that is, has a strong affinity for water. Such a material remains wetted even in the pressence of hydrophobic, that is, resists wetting, materials.

Although reverse osmosis appears to be an ultimate of ultrafiltration, it is in fact a very different mechanism. In liquid water about half the molecules at any moment are in clusters that have the same orderly structure as an ice crystal. In the clusters each water molecule is placed so that the oxygen atom occupies the vertex of a tetrahedron and so that the hydrogen bond connects each pair of water molecules. In a reverse-osmosis membrane a small volume of water is hydrophillically taken up in the spaces between the membrane fibers, where it assumes the ice like configuration. When pressure is applied, molecules on the high pressure side are incorporated into the ice like structure, replacing molecules that "melt" away as liquid water on the other side. The ethanol and similar hydrocarbon type large molecules, cannot conform to the ice-like structure and are therefore excluded or rejected.

Membrane concentration of ethanol and related hydrocarbon compounds with current existing membrane materials and commercial reverse-osmosis techniques are capable of concentrations exceeding (70%) seventy percent ethanol; (97%) ninety-seven percent acetic acid; (99%) ninety-nine percent sugar, dextrine and proteins; as well as (98%) ninety-eight percent monovalent ions, (99%) ninety-nine percent divalent ions, and (99+%) ninety-nine percent plus, trivalent ions.

Because membrane concentration is not a thermal process its mechanical energy demand is low, thus an efficient energy saving process. Energy consumption is in the range of 1 to 10 kilocalories per liter.

The classification or flux of ultrafiltration membrane is a measure of the volume of liquid transmitted by a unit area of membrane in a given period at a given applied pressure. The practical unit is gallons per square foot per day at an applied pressure of (100) one hundren pounds per square inch. The metric unit is micrometers per second at a differential pressure of one (1) atmosphere. A "tight" membrane is one with a flux of one micrometer per second at one atmosphere (equivalent to 14 gallons per square foot per day at 100 pounds per square inch.) Such a membrane rejects the larger molecules of ethanol, acetic acid, dextrine, sugar, proteins, and similar hydrocarbon molecules.

Preferably the membrane is of a sulfonate group polymer, which have enormous affinity for water and thus are highly hydrophillic.

Preferably the ultrafiltration is reverse osmosis. For a reverse osmosis membrane a practical flux is a pressure differential of 50 to 1500 psi, but preferably 100 psi at rate of from 0.01 to 1.0 gallon per square foot, but preferably 0.1 gallon per sq. foot.

Those versed with the commercially used and available membranes will have no difficulty in selecting both kind and type of material, as well as mechanical configurations which will produce the most efficient rejection of the ethanol and/or its related hydrocarbon compounds, thus achieving the object of the invention; removal of water as it is produced in the fuel, thus providing a constant strength fuel to the fuel cell, fuel electrode.

While the invention has been described in a certain degree of particularity as well as with the example fuel, ethanol; it is understood that the disclosure has been made by way of the example, and that changes in cell configuration, electrode materials and configurations, oxygen supply, and method of feed; temperatures, pressures; and similar fuels may be used without departing from the spirit thereof.

What is claimed is:

1. An improvement in the method of supplying "hydrogen" containing hydrocarbon fuels miscible with water to fuel cells, in a manner which provides a constant strength fuel to the cell comprising the steps of:
   recirculating through the section of the fuel cell containing the liquid fuel,
   the reject liquid materials from special type membrane filters, which retain or refuse to pass the basic fuel material,
   disposing of the water passing through the filter,
   controlling the fuel strength in the filter reject to produce the same concentration of fuel as in original feed stock,
   by controlling the rate of filtration, and the quantity of recirculated fuel.

* * * * *